United States Patent [19]
Choi et al.

[11] Patent Number: 5,971,615
[45] Date of Patent: Oct. 26, 1999

[54] HEMISPHERIC BEARING APPARATUS FOR PREVENTING DEFORMATION OF HEMISPHERE

[75] Inventors: Jin-seung Choi, Seoul; Chang-woo Lee, Kyonggi-do, both of Rep. of Korea

[73] Assignee: Samsung Electronics Co., Ltd., Kyungki-do, Rep. of Korea

[21] Appl. No.: 09/010,576

[22] Filed: Jan. 22, 1998

[30] Foreign Application Priority Data

Jan. 22, 1997 [KR] Rep. of Korea .......................... 97-1694

[51] Int. Cl.⁶ ...................................................... F16C 32/06
[52] U.S. Cl. ............................................ 384/108; 384/100
[58] Field of Search ...................................... 384/107, 108, 384/109, 206, 211, 212, 276, 295

[56] References Cited

U.S. PATENT DOCUMENTS 4,090,746  5/1978  Harkins et al. .......................... 384/125
4,790,672  12/1988  Komplin .............................. 384/296 X
5,709,480  1/1998  Hong ........................................ 384/100

*Primary Examiner*—Thomas R. Hannon
*Assistant Examiner*—Brandon C. Stallman
*Attorney, Agent, or Firm*—Sughrue, Mion, Zinn, Macpeak & Seas, PLLC

[57] ABSTRACT

A hemispheric bearing apparatus for preventing deformation of a hemisphere occurring when a shaft is push-fitted into a shaft inserting hole formed at the center of a hemisphere in a hemispheric bearing which supports a thrust load and a radial load at the same time, the apparatus including a pair of hemispheres fitted into a fixing shaft to face each other around a spacer, and having a first section disposed opposite to the spacer and a second section contacted with the spacer; a first deformation preventing portion formed in the first section at a predetermined distance around the fixing shaft to prevent deformation of the hemispheres; and a second deformation preventing mechanism formed in the second section at a predetermined distance around the fixing shaft to prevent deformation of the hemispheres.

4 Claims, 2 Drawing Sheets

HEMISPHERIC BEARING APPARATUS FOR PREVENTING DEFORMATION OF HEMISPHERE

BACKGROUND OF THE INVENTION

1. Field of the Invention

The present invention relates to a hemispheric bearing apparatus, and more particularly, to a hemispheric bearing apparatus for preventing deformation of a hemisphere occurring when a shaft is push-fitted into a shaft inserting hole formed at the center of a hemisphere in a hemispheric bearing which supports a thrust load and a radial load at the same time.

2. Description of the Related Art

Recently, with improvement of technologies in computer industries, in retrieving data, storing them, and reproducing them, there has been a trend to require high accuracy in having no movement or oscillation of a shaft, as well as excellent rotation performance at high speed in driving motors, which are required of various machines, such as a polygon mirror driving gear of a laser printer, a spindle motor of a hard disk, a head driving motor of a VCR, and the like. In this respect, a driving motor capable of stably rotating at high speed by reducing movement or oscillation of the shaft has been developed together with various kinetic pressure fluid bearing apparatuses which enable the shaft of the driving motor to rotate.

In such kinetic pressure fluid bearing apparatuses, there are provided a kinetic pressure generating groove which supports a shaft direction load, and another kinetic pressure generating groove which supports a radial load against the shaft direction. However, in a hemispheric bearing apparatus which has recently been developed, there is provided one kinetic pressure generating groove which supports the shaft direction load and the radial load.

A conventional hemispheric bearing apparatus will be described below.

In the conventional hemispheric bearing apparatus, a pair of hemispheres whose surfaces face each other are tightly fitted into a fixing shaft. A spiral shaped kinetic pressure generating groove having a predetermined depth is formed on the surfaces of the pair of hemispheres. The hemispheres face a cylindrical shaped bushing in which the hemispheric surfaces are engraved. The bushing rotates without contacting with the hemispheres by a kinetic pressure generated by the kinetic pressure generating groove of the hemispheres.

At this time, to maintain a predetermined clearance of several μm between the hemispheric surface and a hemispheric groove of the bushing which face each other, a spacer is precisely formed between the hemispheres. A motor is mounted on an external surface of the bushing. The hemispheric surface and the hemispheric groove of the bushing rotate without contacting each other by a fluid pressure generated by the kinetic pressure generating groove formed on the hemispheric surface as the motor rotates.

However, the aforementioned conventional hemispheric bearing apparatus has several problems.

If the position of the hemisphere fitted into the shaft 20 is varied (see FIG. 1), the clearance formed between the hemispheric surface and the hemispheric groove of the bushing 40 is varied, thereby significantly reducing bearing performance. For this reason, the hemisphere is tightly fitted into the shaft. In this case, deformation of the hemisphere having high accuracy (sphericity; 0.05 μm) occurs due to inner stress occurring when the hemisphere is tightly fitted into the shaft because the shaft hole formed in the hemisphere has a diameter smaller than that of the shaft. As illustrated in FIG. 1, the hemisphere surfaces 30*c* and 30*d* are deformed so that the clearances between the hemispheres 30 and 35 and the hemispheric grooves 30*a* and 30*b* becomes uneven. The fluid pressure is unevenly distributed between the hemispheres and the hemispheric grooves, resulting in deterioration of rotative performance. In addition, the hemispheres are partially contacted with the hemispheric surfaces to cause abrasion of the hemispheres, thereby reducing life-span of the hemispheric bearing.

SUMMARY OF THE INVENTION

Accordingly, the present invention is directed to a hemispheric bearing apparatus for preventing deformation of a hemisphere that substantially obviates one or more of the problems caused by limitations and disadvantages of the related art.

An object of the present invention is to provide a hemispheric bearing apparatus for preventing deformation of a hemisphere in which a deformation preventing portion for absorbing strain of the hemisphere is formed at a predetermined distance separated from a shaft hole of the hemisphere inserted into a shaft in order to prevent deformation occurring when the hemisphere is tightly fitted into the shaft.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a hemispheric bearing apparatus for preventing deformation of a hemisphere according to the present invention includes a fixing shaft, a spacer interleaved into the fixing shaft, a pair of hemispheres fitted into the fixing shaft to face each other around the spacer having a first section disposed opposite to the spacer and a second section contacted with the spacer, and a first deformation preventing portion formed in the first section at a predetermined distance around the fixing shaft to prevent deformation of the hemispheres.

In another aspect, a second deformation preventing portion is formed in the second section at a predetermined distance around the fixing shaft to prevent deformation of the hemispheres. In the preferred embodiment of the present invention, the first deformation preventing portion includes a ring shaped first groove having a first depth and a first width from the first section.

The second deformation preventing portion includes a ring shaped second groove having a second depth and a second width from the second section. Here, the second groove is formed to fit the fixing shaft thereinto. The sum of heights of the first and second grooves is the same as a height of the hemispheres. The first and second grooves are not connected with each other. Thus, the distance between the first groove and the fixing shaft is larger than that between the second groove and the fixing shaft. The second depth depends on the first depth to be coincident with the height of the hemisphere.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
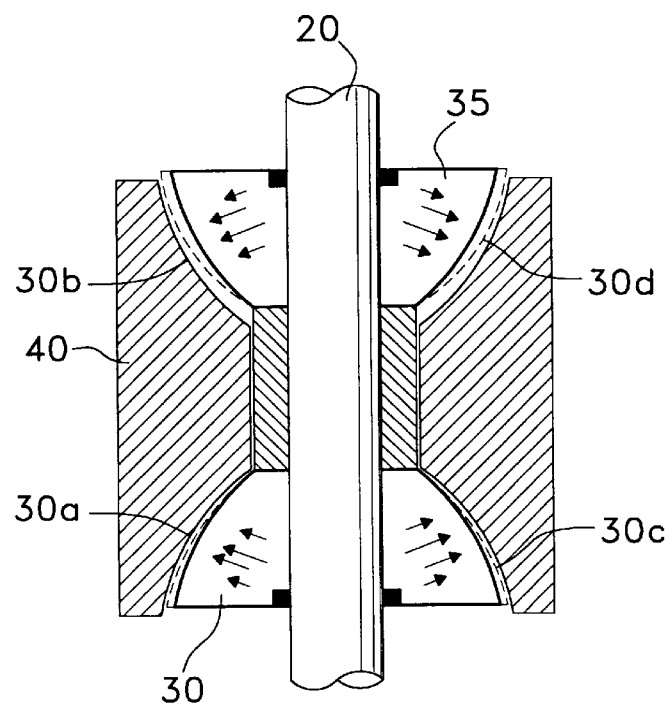
FIG. 1 is a sectional view illustrating deformation of conventional hemispheres when a pair of hemispheres are tightly fitted into a fixing shaft.
Figure 2:
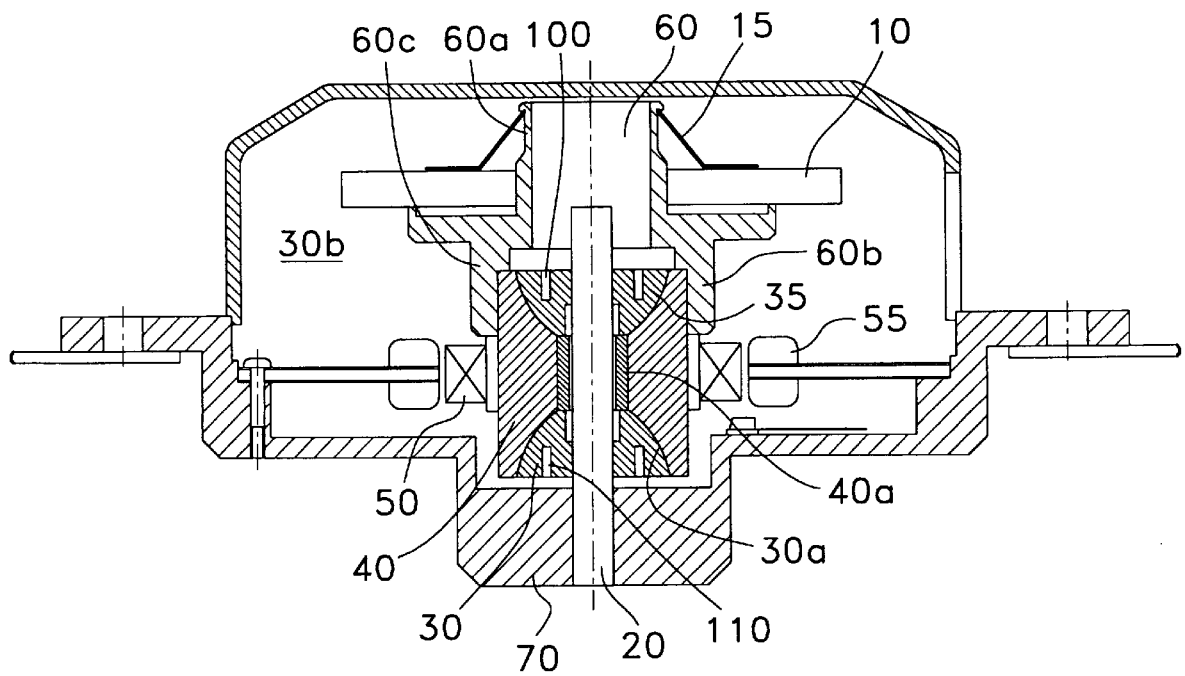
FIG. 2 is a sectional view illustrating a hemispheric bearing apparatus according to the present invention, which is applied to a laser scanning unit.

FIG. 2 is a sectional view illustrating a hemispheric bearing apparatus according to the present invention, which is applied to a polygon mirror driving gear of a laser printer.

The polygon mirror driving gear of a laser printer includes a polygon mirror 10 for reflecting laser beams upon a photosensitive drum (not shown), hemispheric bearing apparatuses 20, 30, 35 and 40 for rotating the polygon mirror 10 at high speed with a minimum friction, turning effect generators 50 and 55 combined with the hemispheric bearing apparatuses, for generating turning effect, and a lower housing 70 for enabling the above elements to be mounted.

In the polygon mirror 10, a through hole having a predetermined diameter is formed. A hub 60 is inserted into the through hole of the polygon mirror 10. The hub 60 is formed to fit the through hole of the polygon mirror 10 into two hollow cylinders 60a and 60b having different diameters respectively. In the cylinder 60b having a large diameter, a concave groove 60c having a predetermined diameter and a predetermined depth is formed.

After the polygon mirror 10 is fitted into the cylinder 60a having a small diameter, it is laid on a projection portion formed at a portion where the cylinder 60a having a small diameter and the cylinder 60b having a large diameter, join. The polygon mirror 10 is then adhered to the projection portion by a plate spring (15).

Furthermore, a bushing 40 is tightly fitted into the concave groove 60c of the cylinder 60b having a large diameter in the hub 60. The bushing 40 has a cylindrical shape having a predetermined height. The bushing 40 also has a diameter larger than the concave groove 60c of the hub 60 in such a manner that the bushing 40 is tightly fitted into the concave groove 60c. Meanwhile, a through hole is formed at center portions of both ends of the bushing 40 to connect the center portions with each other. The through hole has a diameter larger than that of a shaft 20 which is fixed to the lower housing 70.

Hemispheric surfaces of hemispheres 30 and 35 are formed at both ends of the bushing 40 in which the through hole is formed, so as to face each other. Hemispheric grooves 30a and 30b which are carved in a hemispheric shape are formed in the bushing 40.

Since the hemispheric grooves 30a and 30b formed in the bushing 40 have the same shapes as the hemispheres 30 and 35 push-fitted into the shaft 20, the hemispheres 30 and 35 may closely combine with the hemispheric grooves 30a and 30b of the bushing 40. In that case, a fluid pressure is formed between the bushing 40 and hemispheres 30 and 35. As a result, it is hard for the hemispheric grooves 30a and 30b of the bushing 40 to rotate without contacting with the hemispheres 30 and 35. This reduces the function of the fluid bearing.

For this reason, a predetermined clearance is required between the bushing 40 and the hemispheres 30 and 35. A spacer 40a having a predetermined height is fitted into the shaft 20. The hemispheric surfaces of the hemispheres 30 and 35 are fitted into the both ends of the spacer 40a to face each other.

A rotor 50 is formed on external surface of the bushing 40. A stator 55 is mounted in the lower housing 70 to be separated from the rotor 50.

Figure 3:
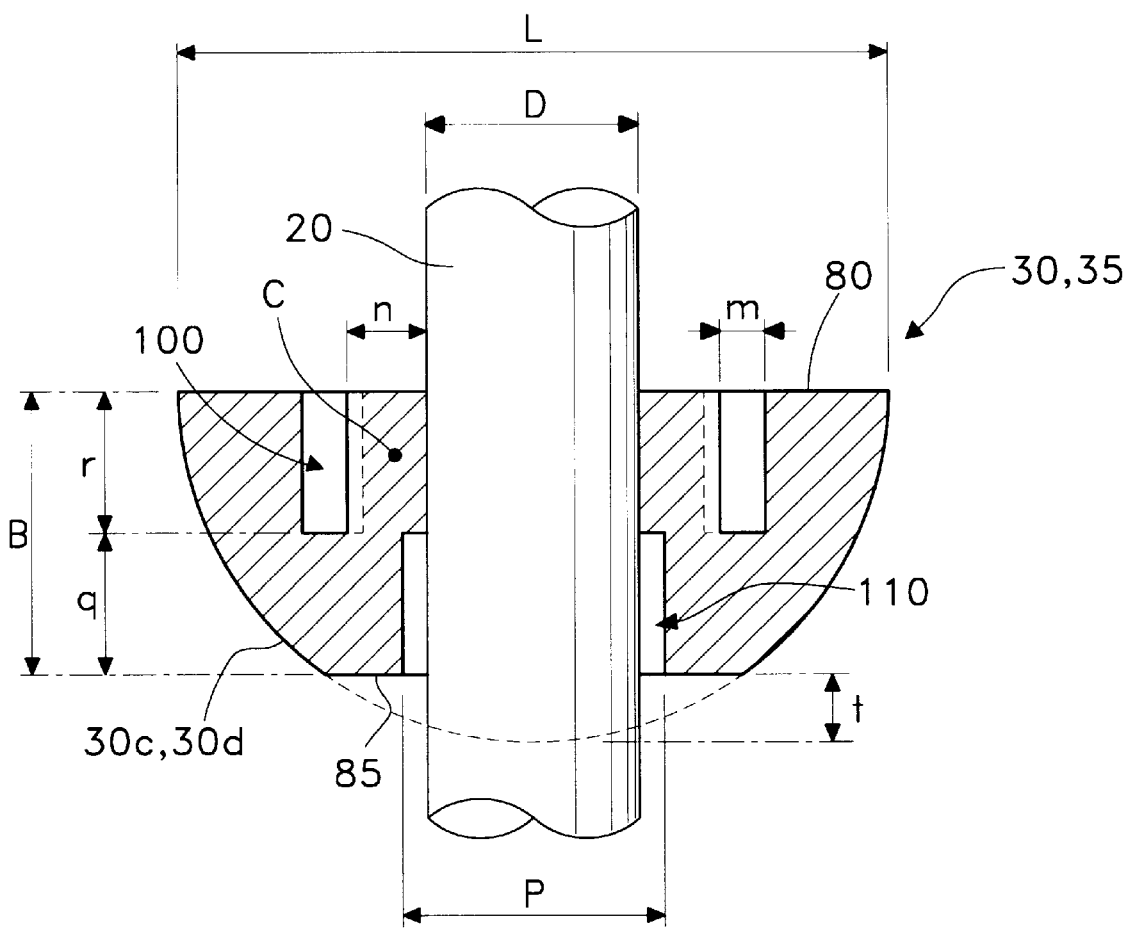
FIG. 3 is a sectional view illustrating a hemisphere having a deformation preventing portion and a fixing shaft in which a hemisphere is tightly fitted.

FIG. 3 is a sectional view illustrating a hemisphere having a deformation preventing portion and a fixing shaft in which a hemisphere is tightly fitted.

The hemispheres 30 and 35 are formed by bisecting a sphere having a predetermined diameter. Polishing such as lapping is performed on the surfaces of the hemispheres 30 and 35 to obtain a predetermined sphericity. Then, an additional process is performed so as not to vary the sphericity having precision when the hemispheres 30 and 35 are push-fitted into the shaft 20.

Moreover, the hemispheres 30 and 35 may include a first section 80 formed by bisecting the sphere, and a second section 85 formed by cutting a peak portion of the hemispheric surface as much as t to adjoin the spacer 40a.

Under the circumstances that the second section 85 adjoins the spacer 40a, the through hole is formed in the hemispheres 30 and 35 to fit the shaft 20 thereinto. A spiral shaped kinetic pressure generating groove (not shown) having a predetermined depth of several $\mu$m is formed on the surfaces of the hemispheres 30 and 35.

Meanwhile, supposing that the diameter of the shaft 20 is D, the height of the hemispheres 30 and 35 is B, and the diameter of the first section 80 is L, a ring shaped first groove, i.e., a first hemispheric deformation preventing portion 100 is formed with a predetermined width m at a portion separated as much as n from a surface of the through hole of the first section 80, and with a predetermined depth r from a surface of the first section 80. C portion is determined as a hemispheric fixing portion by the first hemispheric deformation preventing portion 100, which substantially fixes the hemispheres 30 and 35.

In the same manner as the first section 80 of the hemispheres 30 and 35, a through hole is formed in the second section 85 to fit the shaft 20 thereinto. Since the first hemispheric deformation preventing portion 100 does not reach the second section 85 (if the first hemispheric deformation preventing portion 100 reaches the second section 85, the hemispheric fixing portion C is separated from the hemisphere.), deformation of the hemispheres 30 and 35 occurs at a portion where the first hemispheric deformation preventing portion 100 is not formed.

For this reason, the through hole on the surface of the second section 85 is formed by boring to be larger than the diameter of the shaft 20. A second hemispheric deformation preventing portion 110 is formed at a predetermined depth so as not to be overlapped with the first hemispheric deformation preventing portion 100. Here, the diameter P of the through hole is larger than the diameter D of the shaft. In the same manner as the first hemispheric deformation preventing portion 100, the second hemispheric deformation preventing portion 110 may be formed of a ring shaped second groove (not shown).

In other words, the diameter of the through hole is not larger than n, and the depth q of the second hemispheric deformation preventing portion 110 is obtained by subtracting the depth r of the first hemispheric deformation preventing portion from the overall vertical height B of the hemispheres 30 and 35. This can be expressed as follows.

$$r+q=B$$

In the above equation, it is noted that a bottom portion of the first groove of the first hemispheric deformation preventing portion 100 and a top portion of the second hemispheric deformation preventing portion 110 are disposed on the same horizontal plane as each other. It is therefore noted that the hemispheres 30 and 35 are tightly fitted into the shaft 20 by the hemispheric fixing portion C.

In the aforementioned hemispheric bearing apparatus according to the present invention, the hemispheres 30 and 35 are tightly fitted into the shaft 20 smaller than the diameter P of the second hemispheric deformation preventing portion and larger than the diameter of the through hole, through the through hole of the first section 80. In this case, stress occurs at the hemispheric fixing portion C which is contacted with the shaft 20, due to the shaft 20 having the diameter larger than the through hole. As a result, deformation of the hemispheres occurs as much as strain by the stress.

At this time, since the first hemispheric deformation preventing portion 100 capable of absorbing such strain is formed on an external side of the hemispheric fixing portion around the shaft 20, the strain generated in the hemispheric fixing portion does not reach the hemispheric surface.

In the case that the hemispheres 30 and 35 continue to be tightly fitted into the shaft 20, the shaft 20 reaches the second hemispheric deformation preventing portion 110. In this case, since the diameter of the second hemispheric deformation preventing portion 110 is larger than that of the shaft 20, the hemispheres 30 and 35 are tightly fitted into the shaft 20 without affecting the sphericity of the hemispheres 30 and 35. As a result, it is possible to prevent deformation of the hemispheres 30 and 35, thereby avoiding uneven distribution of the fluid pressure caused by deformation of the hemispheres 30 and 35.

It will be apparent to those skilled in the art that various modifications and variations can be made in the hemispheric bearing apparatus for preventing deformation of a hemisphere according to the present invention without departing from the spirit or scope of the invention. To prevent deformation of the hemisphere when the hemisphere is tightly fitted into the shaft, the second hemispheric deformation preventing portion may be formed with a diameter larger than that of the shaft in the same manner as the present invention. In addition, the second hemispheric deformation preventing portion may be formed of a ring shaped second groove at a portion separated at a predetermined distance from an internal side of the through hole into which the shaft is tightly fitted. Thus, it is intended that the present invention cover the modifications and variations of the invention provided they come within the scope of the appended claims and their equivalents.

What is claimed is:

1. A hemisphere bearing apparatus for preventing deformation of a hemisphere comprising:
   a fixing shaft;
   a spacer disposed along a length of the fixing shaft;
   a pair of hemispheres fitted into the fixing shaft and said spacer, to face each other around the spacer, the pair of hemispheres having a first section disposed opposite to the spacer and a second section contacted with the spacer;
   a first deformation preventing means formed in the first section at a predetermined distance around the fixing shaft to prevent deformation of the hemispheres, said first deformation preventing means including:
   a ring shaped first groove having a first depth and a first width from the first section; and
   a second deformation preventing means formed in the second section at a predetermined distance around the fixing shaft to prevent deformation of the hemispheres, said second deformation preventing means including:
   a ring shaped second groove having a second depth and a second width from the second section;
   wherein a sum of heights of the first groove and the second groove is the same as a height of the hemispheres.

2. The hemispheric bearing apparatus for preventing deformation of a hemisphere as claimed in claim 1, wherein the first and second grooves are not connected with each other.

3. The hemispheric bearing apparatus for preventing deformation of a hemisphere as claimed in claim 2, wherein the distance between the first groove and the fixing shaft is larger than that between the second groove and the fixing shaft.

4. The hemispheric bearing apparatus for preventing deformation of a hemisphere as claimed in claim 1, wherein the second depth is varied depending on the first depth to be coincident with the height of the hemispheres.

* * * * *